(12) United States Patent
Tzur et al.

(10) Patent No.: US 10,832,191 B1
(45) Date of Patent: Nov. 10, 2020

(54) SYSTEM, METHOD, AND COMPUTER PROGRAM FOR METADATA DRIVEN INTERFACE ORCHESTRATION AND MAPPING

(71) Applicant: Amdocs Development Limited, Limassol (CY)

(72) Inventors: Rani Tzur, Tzur Yigal (IL); Daniel Tal, Hod Hasharon (IL); Abhishek Anant Patankar, Pune (IN); Jayant K. Sahu, Pune (IN); Prashantkumar Kashinath Sonawane, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 426 days.

(21) Appl. No.: 15/815,517

(22) Filed: Nov. 16, 2017

(51) Int. Cl.
*G06Q 10/06* (2012.01)
*H04L 12/24* (2006.01)
*G06Q 30/06* (2012.01)

(52) U.S. Cl.
CPC ... *G06Q 10/06312* (2013.01); *H04L 41/0816* (2013.01); *H04L 41/0866* (2013.01); *G06Q 10/0639* (2013.01); *G06Q 30/0635* (2013.01)

(58) Field of Classification Search
USPC .......................................................... 707/740
See application file for complete search history.

(56) References Cited

U.S. PATENT DOCUMENTS

| | | | |
|---|---|---|---|
| 5,745,720 A * | 4/1998 | Kaufel | G06Q 10/10 712/200 |
| 7,797,403 B2 | 9/2010 | Vedula et al. | |
| 8,577,733 B2 | 11/2013 | Atwater et al. | |
| 8,751,275 B2 | 6/2014 | Ramdattan et al. | |
| 9,299,039 B1 * | 3/2016 | Wang | G06Q 10/063116 |
| 9,607,326 B2 | 3/2017 | Dueck et al. | |
| 10,009,410 B2 * | 6/2018 | Huang | H04L 67/06 |
| 10,296,301 B2 * | 5/2019 | Maluf | G06F 8/34 |
| 10,324,773 B2 * | 6/2019 | Wing | G06F 1/30 |
| 10,338,967 B2 * | 7/2019 | Duttagupta | G06F 11/3419 |
| 10,503,484 B2 * | 12/2019 | Zhang | G06F 8/34 |
| 2014/0012856 A1 | 1/2014 | Abdelrahman et al. | |
| 2017/0004423 A1 | 1/2017 | DeLuisi et al. | |
| 2017/0140307 A1 * | 5/2017 | Gottemukkala | G06Q 10/06311 |

* cited by examiner

*Primary Examiner* — Cam Linh T Nguyen (74) *Attorney, Agent, or Firm* — Zilka-Kotab, P.C.

(57) ABSTRACT

A system, method, and computer program product are provided for metadata driven interface orchestration and mapping. In operation, a system defines a plurality of job items in a master enterprise catalogue by mapping all possible business requests to one or more pre-defined job items. The system defines job specifications in the master enterprise catalogue by mapping the plurality of job items to one or more pre-defined job specifications. Further, the system defines a job list in the master enterprise catalogue by building a sequence of outgoing requests based on possible use cases and the job specifications. The system defines an order context associated with one or more orders. Additionally, the system automatically generates a job plan including a plurality of activities utilizing the job list from the master enterprise catalogue and the order context. Moreover, the system automatically generates interfaces with a plurality of external systems based on the job plan including the plurality of activities.

18 Claims, 8 Drawing Sheets

SYSTEM, METHOD, AND COMPUTER PROGRAM FOR METADATA DRIVEN INTERFACE ORCHESTRATION AND MAPPING

FIELD OF THE INVENTION

The present invention relates to application programming interface (API) orchestration and mapping.

BACKGROUND

Currently, integration between various telecommunication systems requires manually building pre-define activities and the static mapping of internal to external business models, all defined by programming language.

Mapping between internal models to the interface provider model is currently statically defined in code. Further, orchestration of external requests is typically accomplished using pre-define activities and dependencies, per use-case.

There is thus a need for addressing these and/or other issues associated with the prior art.

SUMMARY

A system, method, and computer program product are provided for metadata driven interface orchestration and mapping. In operation, a system defines a plurality of job items in a master enterprise catalogue by mapping all possible business requests to one or more pre-defined job items. The system defines job specifications in the master enterprise catalogue by mapping the plurality of job items to one or more pre-defined job specifications. Further, the system defines a job list in the master enterprise catalogue by building a sequence of outgoing requests based on possible use cases and the job specifications. The system defines an order context associated with one or more orders. Additionally, the system automatically generates a job plan including a plurality of activities utilizing the job list from the master enterprise catalogue and the order context. Moreover, the system automatically generates interfaces with a plurality of external systems based on the job plan including the plurality of activities.

DETAILED DESCRIPTION

Figure 1:
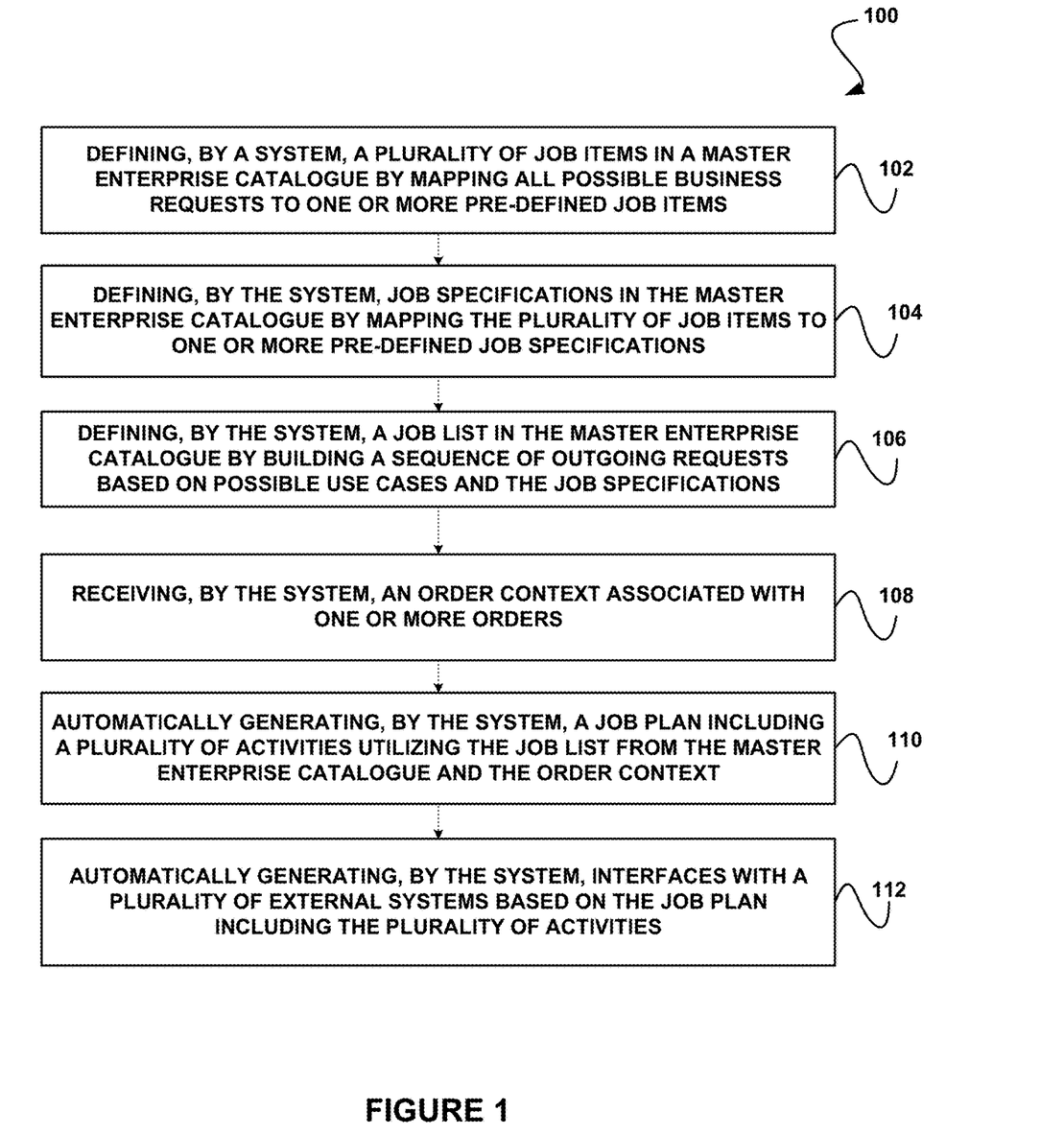
FIG. 1 illustrates a method for metadata driven interface orchestration and mapping, in accordance with one embodiment.

FIG. 1 illustrates a method 100 for metadata driven interface orchestration and mapping, in accordance with one embodiment.

In operation, a system defines a plurality of job items in a master enterprise catalogue by mapping all possible business requests to one or more pre-defined job items. See operation 102. A job item refers to a granular part of an outgoing request representing a task/action on an external system. In one embodiment, each of the plurality of job items may include a message structure as required by a corresponding external system. Further, in one embodiment, the master enterprise catalogue may be associated with a communication service provider.

The system defines job specifications in the master enterprise catalogue by mapping the plurality of job items to one or more pre-defined job specifications. See operation 104. A job specification refers to a design-time representation of an outgoing request consuming a specific application programming interface (API). In one embodiment, each of the job specifications may specify an interface adapter to be utilized for a corresponding external system.

Further, the system defines a job list in the master enterprise catalogue by building a sequence of outgoing requests based on possible use cases and the job specifications. See operation 106. A job list refers to a sequence of optional outgoing requests for a given use-case. In one embodiment, the job list may define a relationship between a job specification and a corresponding UNDO job specification.

The system defines an order context associated with one or more orders. See operation 108. Additionally, the system automatically generates a job plan including a plurality of activities utilizing the job list from the master enterprise catalogue and the order context. See operation 110. Activities (i.e. job activities) refer to instantiations of a job specification and represent a single request sent to an outgoing system. In one embodiment, generating the job plan may include generating dependencies and sequences associated with messages.

Moreover, the system automatically generates interfaces with a plurality of external systems based on the job plan including the plurality of activities. See operation 112. This may include executing an instantiation of a job list and orchestrating the execution of outgoing requests.

In one embodiment, the system may provide a user interface providing visualization and orchestration capabilities for external interfaces associated with the plurality of external systems. In this case, the system may display information associated with exact points of failures and failed messages associated with the external interfaces associated with the plurality of external systems.

It should be noted that the method 100 may be implemented utilizing various systems, hardware, software, applications, user interfaces, etc., as dictated by the implementer. For example, the system implementing the method 100 (e.g. the integration system of FIG. 2, etc.) may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
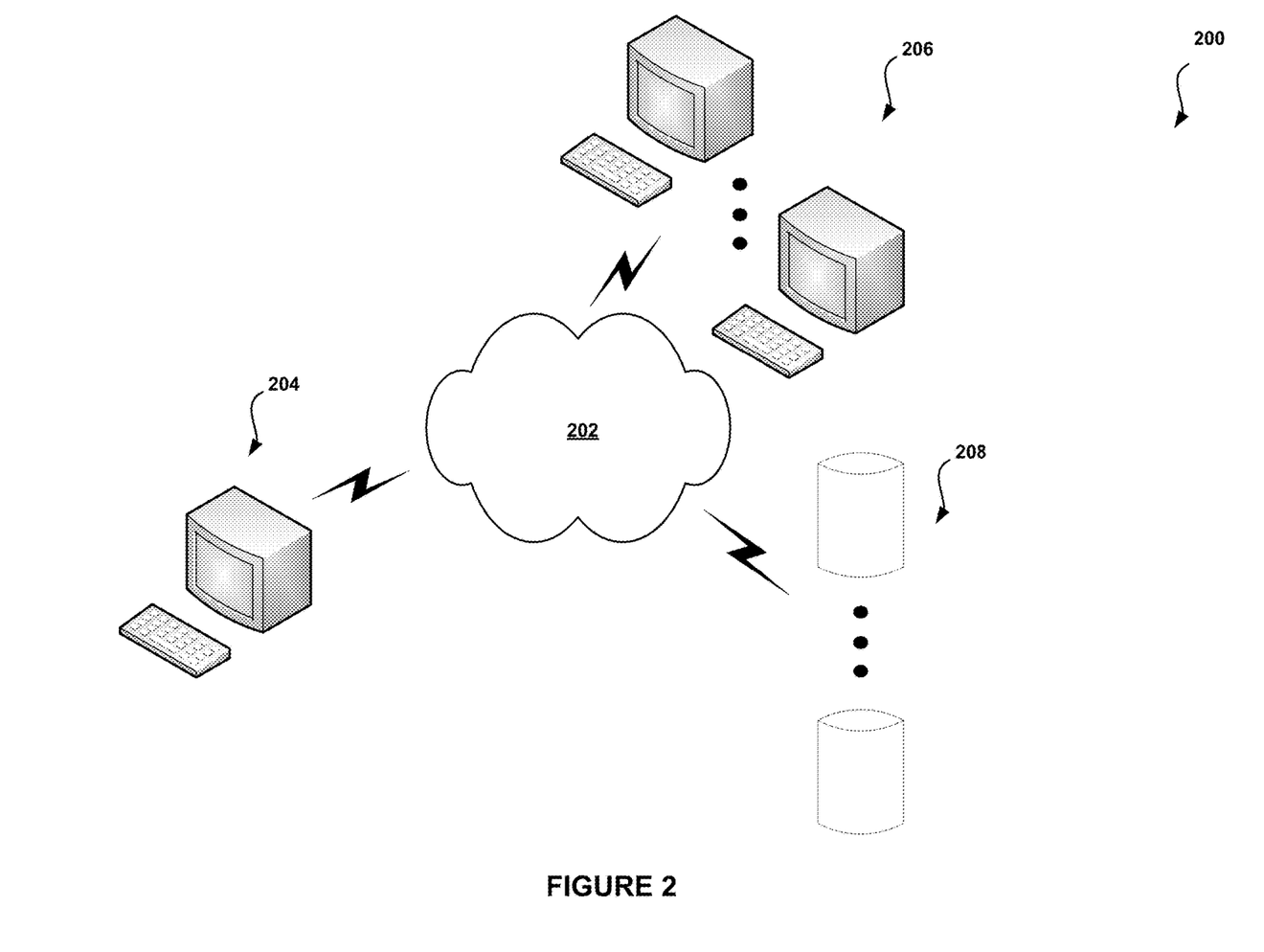
FIG. 2 shows a system for metadata driven interface orchestration and mapping, in accordance with one embodiment.

FIG. 2 shows a system 200 for metadata driven interface orchestration and mapping, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes an integration system 204, which may implement a variety of applications or software, etc. The integration system 204 may be capable of communicating with a plurality of systems 206 (e.g. telecommunication systems, etc.), either directly or over one or more networks 202, for efficiently designing, building, and executing integration between the systems 206, etc. For example, the systems 206 may include a Service Order Manager (SOM) system that is in communication with a plurality of telecommunication systems, with the integration system 204 providing integration and orchestrating capabilities between the systems. The integration system 204 may also be in communication with one or more repositories/databases 208. The integration system 204 provides metadata for defining how integration is orchestrated and how outbound message request design. Using the integration system 204 moves the integration effort to be configurable metadata definition instead of coding.

A SOM system is responsible for managing service order fulfillment. The SOM system includes capabilities such as: exposing a manage order interface for receiving sales orders and update on its fulfillment progress; providing product to service decomposition using a service composition manager, based on customer install base and catalog definition; providing integration to a service inventory to manage the service lifecycle; providing integration to network inventory to manage the service resource design and assign; and providing integration to an activation system to manage the service activation.

The SOM system is typically responsible for orchestrating and coordinating between different systems by consuming external interfaces according to the right dependency with the relevant information. Integration between the SOM system and external systems is a key capability of any fulfillment solution. Building integration with external interfaces is a time consuming activity that require high-skilled developer skills.

Orchestrating outgoing requests involves: determining the external interfaces to consume, the sequence of requests and dependency to other activities in the flow; and mapping of the SOM business model to the external system business model considering a specific business case.

The integration system 204 accomplishes and simplifies both of these aspects by providing a metadata driven tool that enables modeling of the required integration points according to the required fulfillment use-case and enabling mapping between the SOM business model and the external business models for all possible use-cases.

Use of the integration system 204 allows for an improved time to market by simplifying the process of consuming new interfaces to external systems and by enabling rapid deployment of changes in existing integrations.

Use of the integration system 204 also allows for reduced OPEX. This generic capability unifies all the different integration implementations. The integration system 204 simplifies the way to identify, resolve and rollout fixes as everything is based in catalog definition (as opposed to code changes).

The integration system 204 employs metadata driven interface orchestration to reduce the effort of building and maintaining fulfillment interfaces orchestration.

In operation, the integration system 204 implements a fulfillment integration point by performing various steps (in the catalogue). As part of this process, the integration system 204 performs interface design by defining a new interaction between fulfillment systems and external systems. This includes the integration system 204 defining the pre-requisite activities (i.e. the activities that are required to be executed before and after consuming the new interface). The integration system 204 also defines the data-model (i.e. the information required by the external systems per each supported use-case). This exercise includes the mapping between the consuming and exposing application business model. This also includes information being sent by the external systems to the consuming application.

The integration system 204 also performs amendments and cancellations, which define how updates and cancellations are being processed by the external systems. Further, the integration system 204 defines the possible failure points, error messages, and the required resolution options.

The technical implementation performed by the integration system 204 includes the construction activities, in high-level, that can be split into a few activities: flow sequence construction; model definition; and technical integration. Flow sequence construction includes building the activities dependencies per use-case. Model definition includes data mapping between consumer/provider per each use-case. Technical integration includes constructing the technical integration between the applications. In one embodiment, the integration system 204 may utilize a plugin to handle this technical integration.

The integration system 204 utilizes design-time entities including a job list, a job spec, and a job item. A job list refers to a sequence of optional outgoing requests for a given use-case. A job spec refers to a design-time representation of an outgoing request consuming a specific application programming interface. A job item refers to a granular part of outgoing request representing a task/action on the external system.

The integration system 204 utilizes run-time entities including a job plan execution and a job activity. Job plan execution refers to an instantiation of a job list, orchestrating the execution of outgoing requests. A job activity refers to an instantiation of a job spec and represents a single request sent to the outgoing system. The design-time definition suggests to build the integration in a bottom-up approach.

Figure 3:
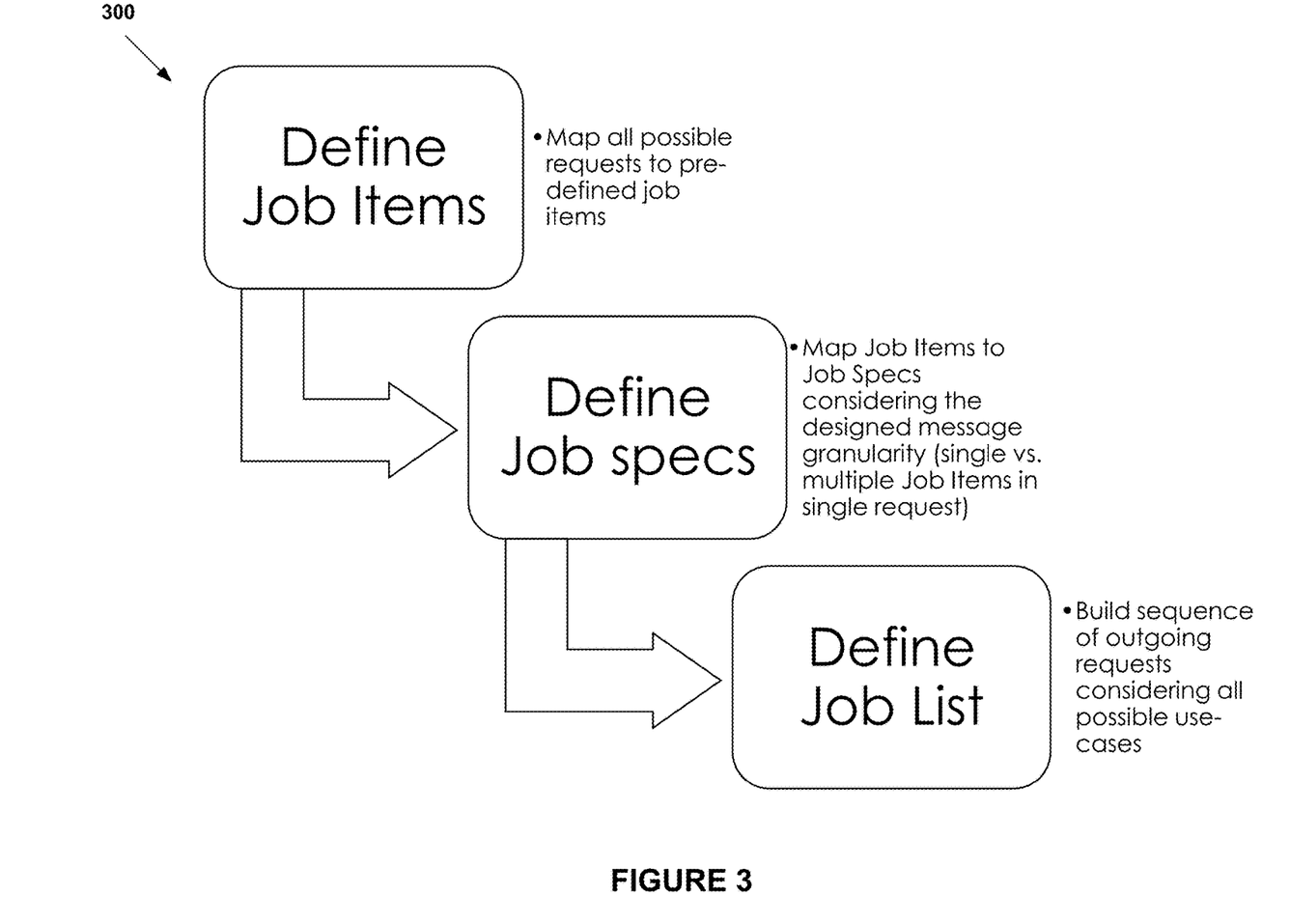
FIG. 3 shows a system flow diagram for metadata driven interface orchestration and mapping, in accordance with one embodiment.

FIG. 3 shows a system flow diagram 300 for metadata driven interface orchestration and mapping, in accordance with one embodiment. As an option, the diagram 300 may be implemented in the context of the details of the previous figures and/or any subsequent figure(s). Of course, however, the diagram 300 may be implemented in the context of any desired environment. Further, the aforementioned definitions may equally apply to the description below.

In operation, an integration system defines job items. This includes mapping all possible business requests to pre-defined job items.

Further, the integration system defines job specs. This includes mapping job items to job specs considering the desired message granularity (single vs. multiple job items in a single request).

In addition, the integration system defines a job list. This includes building a sequence of outgoing requests including possible use cases.

Figure 4:
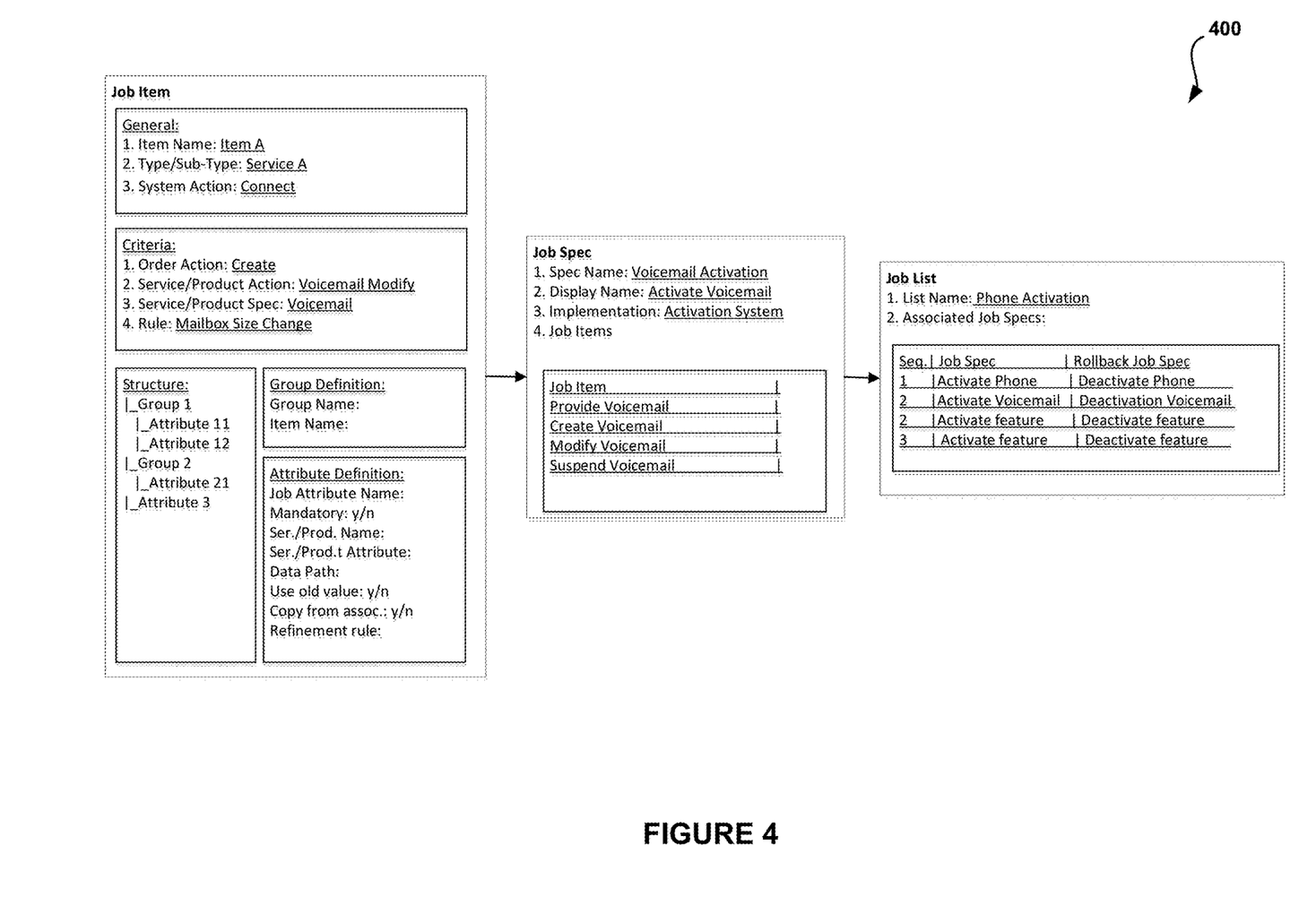
FIG. 4 shows an example illustrating how activation of phone service and associated sub-services may be defined, in accordance with one embodiment.

FIG. 4 shows an example 400 illustrating how activation of phone service and associated sub-services may be defined, in accordance with one embodiment. As an option, the example 400 may be implemented in the context of the details of the previous figures and/or any subsequent figure(s). Of course, however, the example 400 may be implemented in the context of any desired environment. Further, the aforementioned definitions may equally apply to the description below.

In this example, the user has defined a job list that manages the activation of a phone service with all required requests to the activation system. The defined job spec handles the interface to activation system of voicemail service. This job spec includes the different job items that handle different use-cases. In this example, the job item handles modification of voicemail service.

The integration system performs job plan generation as part of a run-time orchestration and enrichment. When interaction with external systems is required, a job plan generation activity is executed by the integration system using the job list identification as an input. The job pan is generated and composed of a sequence of activities, where each activity handles a specific job spec. The activity implementation of each activity is determined according to the job spec configuration.

The job plan execution generation steps performed by the integration system include: using the job list identification as the input for the generation logic; per each job spec, evaluating all related job items criteria, where job specs without any job item that is meeting the criteria are excluded from the plan; and per each job spec, generating a job execution activity. The integration system applies dependencies between the job execution activities according to the job spec sequence definition in the job list.

Figure 5:
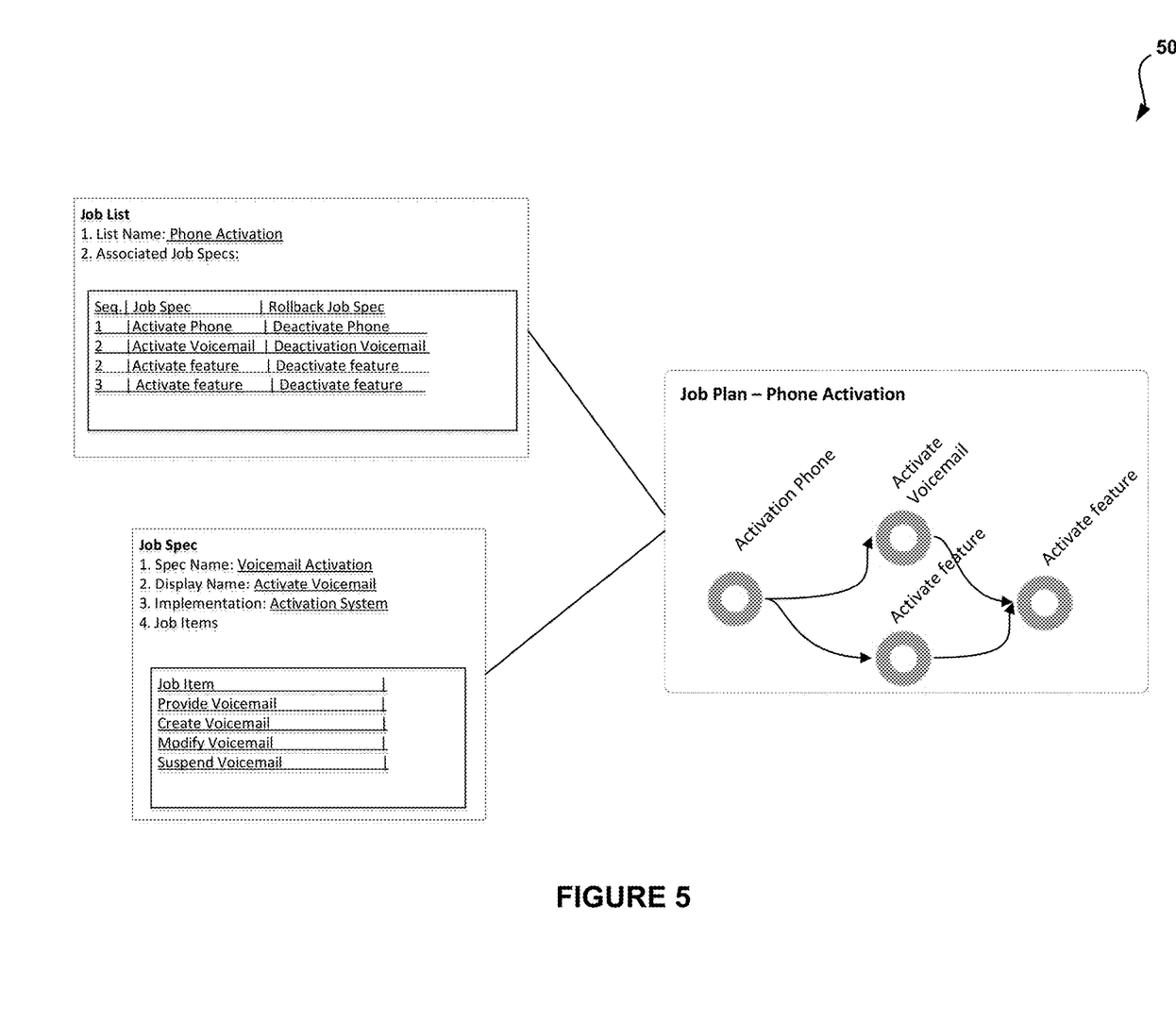
FIG. 5 shows an example illustrating how a job plan execution is generated based on a job list definition, in accordance with one embodiment.

FIG. 5 shows an example 500 illustrating how a job plan execution is generated based on a job list definition, in accordance with one embodiment. As an option, the example 500 may be implemented in the context of the details of the previous figures and/or any subsequent figure(s). Of course, however, the example 500 may be implemented in the context of any desired environment. Further, the aforementioned definitions may equally apply to the description below.

With respect to job plan execution, the activity implementation of the job execution activity is responsible for the external interface consumption and the mapping of the generic job model to the external model (e.g. via a plugin, etc.). Fallout handling as a result of errors sent by the external system may be resolved on the request/job spec level and enable a retry of a message and its auto-completion. The job list holds the relation between job spec and its UNDO job spec. When rollback is needed (e.g. Amend/Cancel order, etc.), the integration system generates an UNDO job plan with the dependency as mentioned in the job list 3.

With respect to job item enrichment, in one embodiment, sending an outgoing request may involve two stages. In this case, the first stage includes internal enrichment, which includes building a generic request based on the metadata definition. This stage is generic and is not dependent on the external system.

Figure 6:
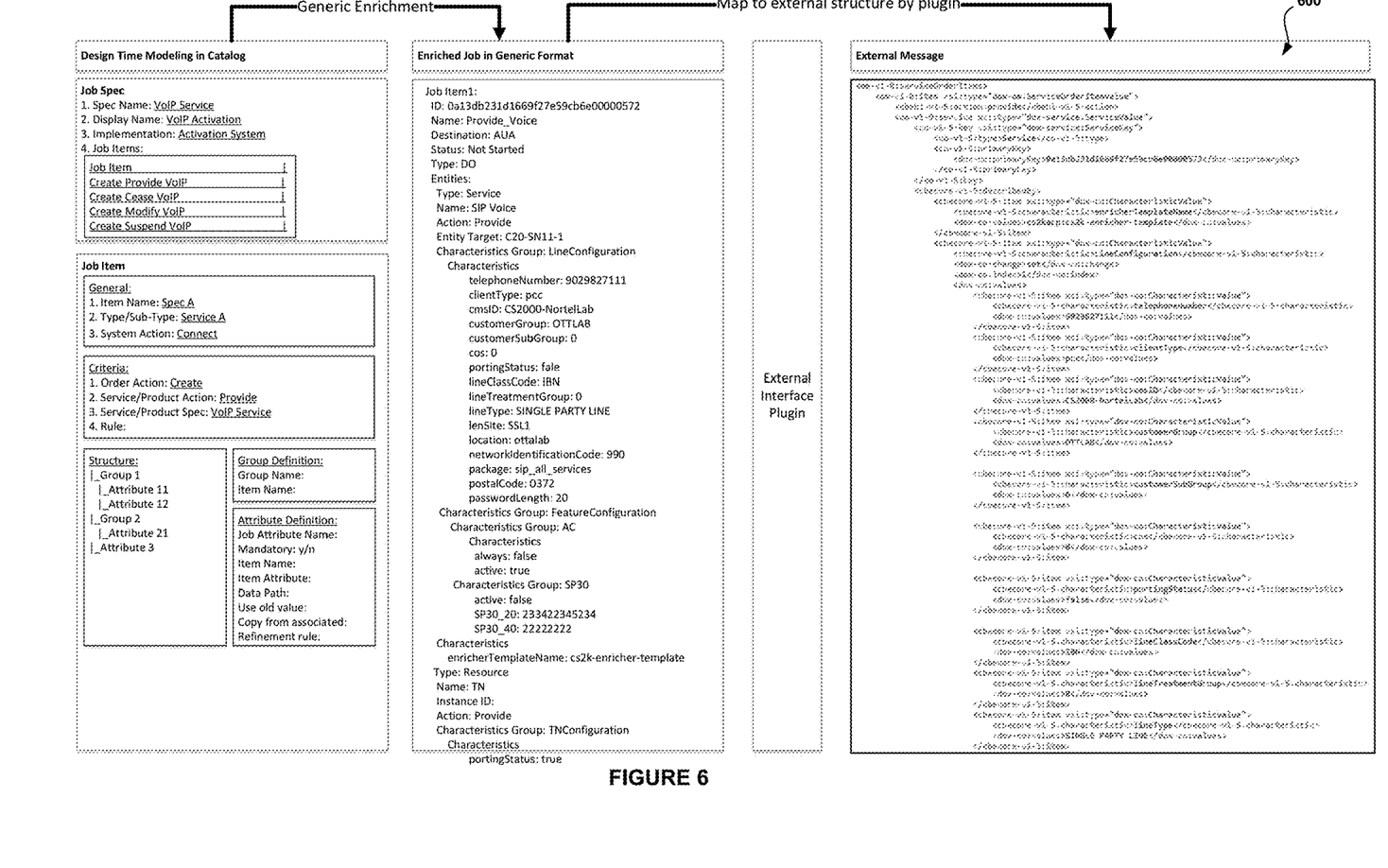
FIG. 6 shows an example illustrating generic/internal enrichment and possible plugin that transforms an internal model to an external model, in accordance with one embodiment.

The second stage may include mapping a generic model to an external model. In one embodiment, this stage may be handled by an external system plugin (activity implementation), which may be responsible for the technical integration.

FIG. 6 shows an example 600 illustrating generic/internal enrichment and possible plugin that transforms an internal model to an external model, in accordance with one embodiment. As an option, the example 600 may be implemented in the context of the details of the previous figures and/or any subsequent figure(s). Of course, however, the example 600 may be implemented in the context of any desired environment. Further, the aforementioned definitions may equally apply to the description below.

Some of the benefits of system and method described herein include improved time to market and decreased operational costs. Utilizing the system and method described herein shortens the time to consume new interfaces (i.e. shortens the time to update system functionality and support new business requirements). The system and method described herein provide visualization and orchestration capabilities for external interfaces. On the event of failure, a user is able to see the exact point of failures, the failed messages and also to take actions to overcome the error. This saves developer time by eliminating the need for logs reading and debugging.

The system and method described herein introduce dynamic generation of an execution plan based on catalog information, which is focused on the integration points. The system and method described herein also provide a generic model to define outgoing requests that is supporting different use-cases in the telecommunication industry. The generic model is enriched at run-time based on the metadata definition together with the execution information.

Figure 7:
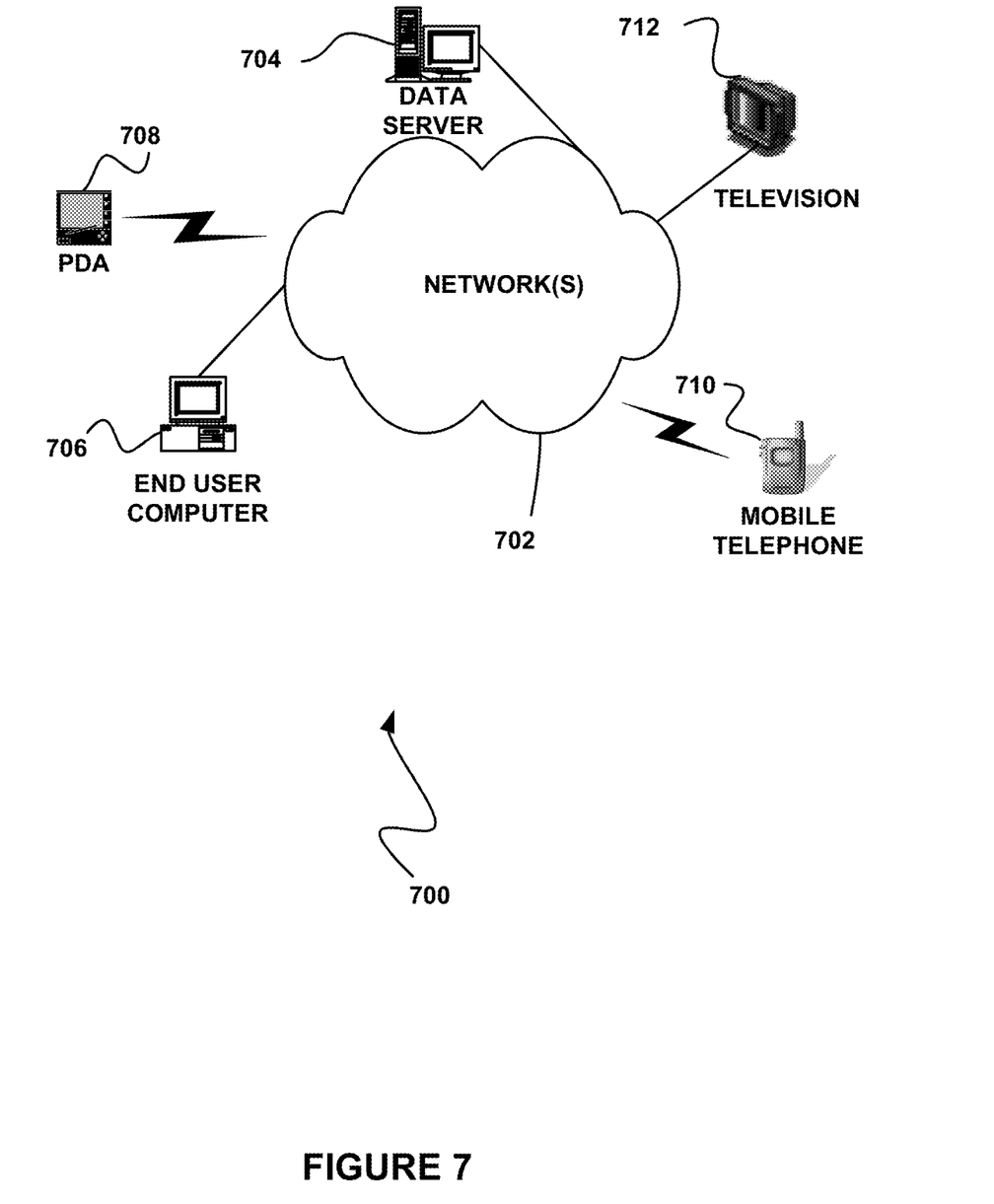
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
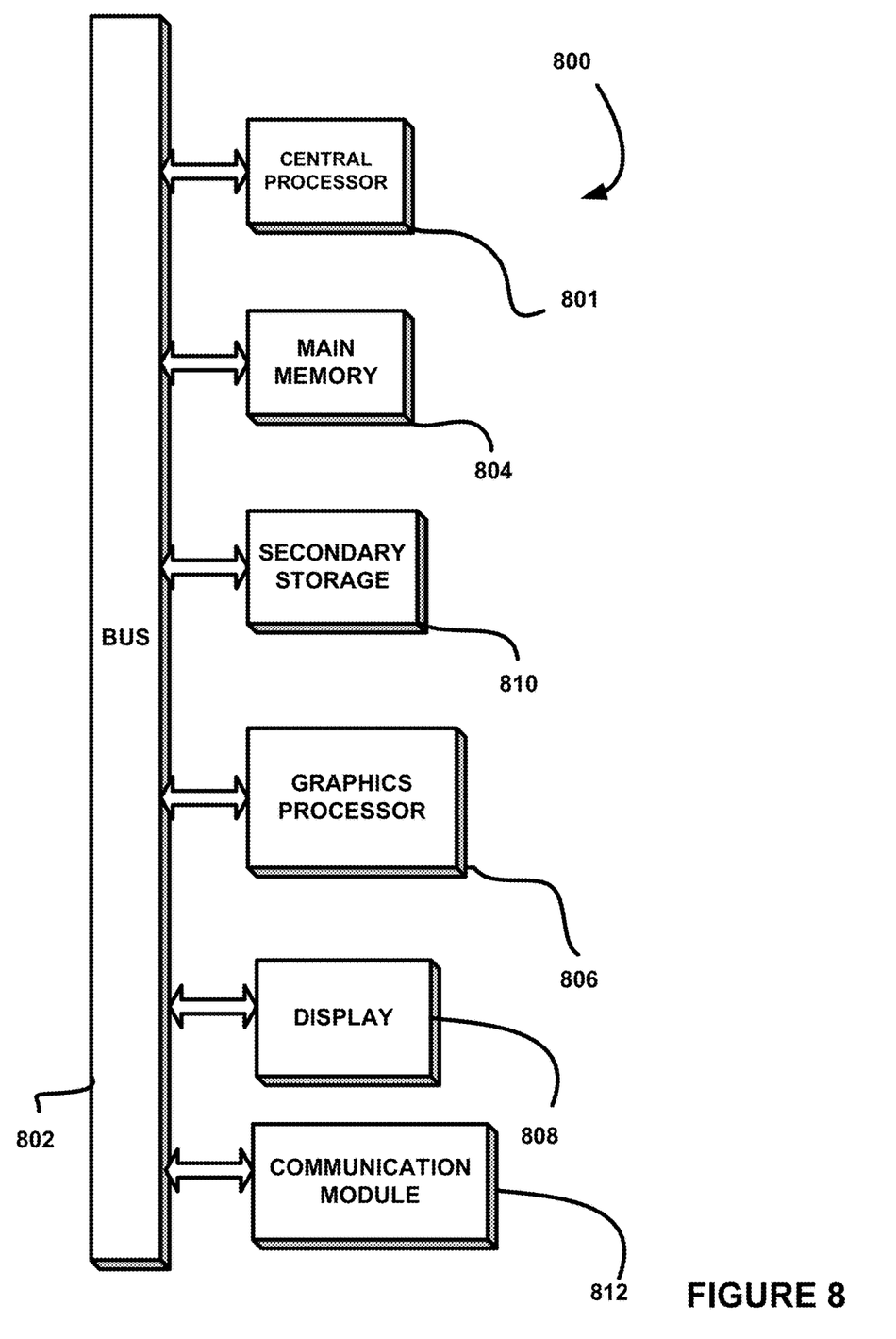
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of non-transitory computer-readable media.

The system 800 may also include one or more communication modules 812. The communication module 812 may be operable to facilitate communication between the system 800 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
defining, by a system, a plurality of job items in a master enterprise catalogue by mapping all possible business requests to one or more pre-defined job items, wherein each job item of the plurality of job items defines a message structure required for communicating a task to a corresponding external system;
defining, by the system, job specifications in the master enterprise catalogue by mapping the plurality of job items to one or more pre-defined job specifications, wherein each of the job specifications is a representation of a particular outgoing request;
defining, by the system, a job list in the master enterprise catalogue by building a sequence of outgoing requests based on possible use cases and the job specifications;
receiving, by the system, an order context associated with one or more orders;
automatically generating, by the system, a job plan including a plurality of activities utilizing the job list from the master enterprise catalogue and the order context wherein the job plan is an instantiation of the job list which orchestrates execution of outgoing requests, and wherein each activity of the plurality of activities is an instantiation of one of the job specifications and represents a single request to be sent to a particular external system; and
automatically generating, by the system, interfaces with a plurality of external systems based on the job plan including the plurality of activities for use in communicating the outgoing requests to the plurality of external systems.

2. The method of claim 1, wherein each of the job specifications specify an interface adapter to be utilized for a corresponding external system of the plurality of external systems.

3. The method of claim 1, wherein the job list defines a relationship between a job specification and a corresponding UNDO job specification.

4. The method of claim 1, wherein generating the job plan includes generating dependencies and sequences associated with the outgoing requests.

5. The method of claim 1, wherein the system provides a user interface providing visualization and orchestration capabilities for external interfaces associated with the plurality of external systems.

6. The method of claim 5, wherein the system displays information associated with exact points of failures and failed messages associated with the external interfaces associated with the plurality of external systems.

7. The method of claim 1, wherein automatically generating, by the system, the job plan includes:
using the job list as input for generation logic;
per each job specification, evaluating criteria of all related job item, where job specifications without any job item that is meeting the criteria are excluded from the job plan; and
per each job specification included in the job plan, generating an activity;
applying dependencies between the plurality of activities according to a job specification sequence definition in the job list.

8. A computer program product embodied on a non-transitory computer readable medium, comprising computer code for:
defining, by a system, a plurality of job items in a master enterprise catalogue by mapping all possible business requests to one or more pre-defined job items, wherein each job item of the plurality of job items defines a message structure required for communicating a task to a corresponding external system;
defining, by the system, job specifications in the master enterprise catalogue by mapping the plurality of job items to one or more pre-defined job specifications, wherein each of the job specifications is a representation of a particular outgoing request;
defining, by the system, a job list in the master enterprise catalogue by building a sequence of outgoing requests based on possible use cases and the job specifications;
receiving, by the system, an order context associated with one or more orders;
automatically generating, by the system, a job plan including a plurality of activities utilizing the job list from the master enterprise catalogue and the order context wherein the job plan is an instantiation of the job list which orchestrates execution of outgoing requests, and wherein each activity of the plurality of activities is an instantiation of one of the job specifications and represents a single request to be sent to a particular external system; and
automatically generating, by the system, interfaces with a plurality of external systems based on the job plan including the plurality of activities for use in communicating the outgoing requests to the plurality of external systems.

9. The computer program product of claim 8, wherein each of the job specifications specify an interface adapter to be utilized for a corresponding external system of the plurality of external systems.

10. The computer program product of claim 8, wherein the job list defines a relationship between a job specification and a corresponding UNDO job specification.

11. The computer program product of claim 8, wherein generating the job plan includes generating dependencies and sequences associated with the outgoing requests.

12. The computer program product of claim 8, wherein the system provides a user interface providing visualization and orchestration capabilities for external interfaces associated with the plurality of external systems.

13. The computer program product of claim 12, wherein the system displays information associated with exact points of failures and failed messages associated with the external interfaces associated with the plurality of external systems.

14. A system, comprising one or more processors, operable for:
defining, by the system, a plurality of job items in a master enterprise catalogue by mapping all possible business requests to one or more pre-defined job items, wherein each job item of the plurality of job items defines a message structure required for communicating a task to a corresponding external system;

defining, by the system, job specifications in the master enterprise catalogue by mapping the plurality of job items to one or more pre-defined job specifications, wherein each of the job specifications is a representation of a particular outgoing request;

defining, by the system, a job list in the master enterprise catalogue by building a sequence of outgoing requests based on possible use cases and the job specifications;

receiving, by the system, an order context associated with one or more orders;

automatically generating, by the system, a job plan including a plurality of activities utilizing the job list from the master enterprise catalogue and the order context, wherein the job plan is an instantiation of the job list which orchestrates execution of outgoing requests, and wherein each activity of the plurality of activities is an instantiation of one of the job specifications and represents a single request to be sent to a particular external system; and automatically generating, by the system, interfaces with a plurality of external systems based on the job plan including the plurality of activities for use in communicating the outgoing requests to the plurality of external systems.

15. The system of claim 14, wherein each of the job specifications specify an interface adapter to be utilized for a corresponding external system of the plurality of external systems.

16. The system of claim 14, wherein the job list defines a relationship between a job specification and a corresponding UNDO job specification.

17. The system of claim 14, wherein generating the job plan includes generating dependencies and sequences associated with the outgoing requests.

18. The system of claim 14, wherein the system provides a user interface providing visualization and orchestration capabilities for external interfaces associated with the plurality of external systems.

* * * * *

UNITED STATES PATENT AND TRADEMARK OFFICE
CERTIFICATE OF CORRECTION

| | | |
|---|---|---|
| PATENT NO. | : 10,832,191 B1 | Page 1 of 1 |
| APPLICATION NO. | : 15/815517 | |
| DATED | : November 10, 2020 | |
| INVENTOR(S) | : Rani Tzur et al. | |

It is certified that error appears in the above-identified patent and that said Letters Patent is hereby corrected as shown below:

In the Claims

Column 9, Line 34 please replace "context wherein" with --context, wherein--

Column 10, Line 32 please replace "context wherein" with --context, wherein--

Signed and Sealed this
Sixth Day of January, 2026

John A. Squires
*Director of the United States Patent and Trademark Office*